July 9, 1957 R. LAPSLEY 2,798,626
MECHANISM FOR MATERIALS HANDLING MACHINES
Filed Nov. 19, 1953 3 Sheets-Sheet 1

INVENTOR.
ROBERT LAPSLEY
BY Kenneth C. Witt
ATTY.

July 9, 1957 R. LAPSLEY 2,798,626
MECHANISM FOR MATERIALS HANDLING MACHINES
Filed Nov. 19, 1953 3 Sheets-Sheet 3

INVENTOR.
ROBERT LAPSLEY
BY Kenneth C. Witt
ATTY.

United States Patent Office 2,798,626
Patented July 9, 1957

2,798,626

MECHANISM FOR MATERIALS HANDLING MACHINES

Robert Lapsley, Berrien Springs, Mich., assignor to Clark Equipment Company, a corporation of Michigan Application November 19, 1953, Serial No. 393,035

10 Claims. (Cl. 214—140)

My present invention relates generally to materials handling machines, and, more particularly, is concerned with a stabilizing mechanism for maintaining a shovel or other load handling device, as it is elevated, in the same position relative to the ground.

Preferably my present invention is embodied in a machine comprising a shovel or other load handling device which is pivotally mounted to arm means carried by a vehicle. First hydraulic actuating assembly means, which is carried by the vehicle frame, is employed for effecting pivotal movement of the arm means relative to the vehicle whereby the shovel may be raised and lowered. Second hydraulic actuating assembly means, which is carried by the arm means, is employed for effecting pivotal movement of the shovel relative to the arm means.

In order to effect actuation of the first hydraulic actuating assembly means, so as to pivot the arm means and elevate the shovel, first fluid passageway means is arranged between a pump, which develops fluid under pressure, and one end of the first hydraulic means. Suitable valve means is provided for controlling the flow of fluid through the first fluid passageway means.

It is an object of my present invention to provide stabilizing mechanism that will cause the shovel or other load handling device to be pivoted relative to the arm means as the shovel is elevated for maintaining a section of the shovel cut by any given horizontal plane substantially parallel to the ground, or causing the shovel otherwise to maintain a predetermined relation to the ground.

The stabilizing mechanism of my present invention comprises second fluid passageway means arranged to convey fluid from the other end of the first hydraulic means to one end of the second hydraulic means. When fluid is directed to the said one end of the first hydraulic means, fluid is simultaneously forced from the said other end through the second fluid passageway means to the second hydraulic means. By virtue of this arrangement the first and second hydraulic means are actuated synchronously and the shovel is tilted or pivoted at the same time that it is elevated for maintaining the shovel parallel to the ground.

It is a feature of my invention that additional valve and fluid passageway means are provided so that the second hydraulic means may be actuated independently of the first hydraulic means.

Now, in order to acquaint those skilled in the art with the manner of constructing and using the power shovel stabilizing mechanism of my present invention, I shall describe in connection with the accompanying drawings, a preferred embodiment of my invention.

Figure 1:
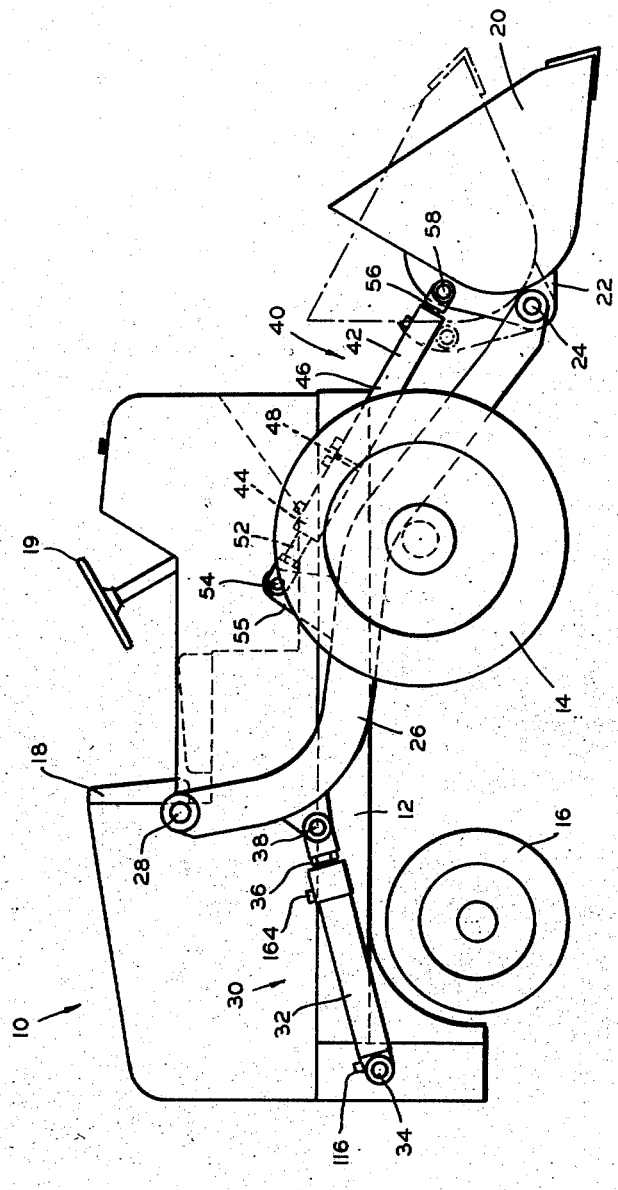
Figures 1 and 2 are side elevational views of my present invention embodied with a mobile vehicle and a power actuated shovel with the latter being shown in various operating positions.
Figure 2:
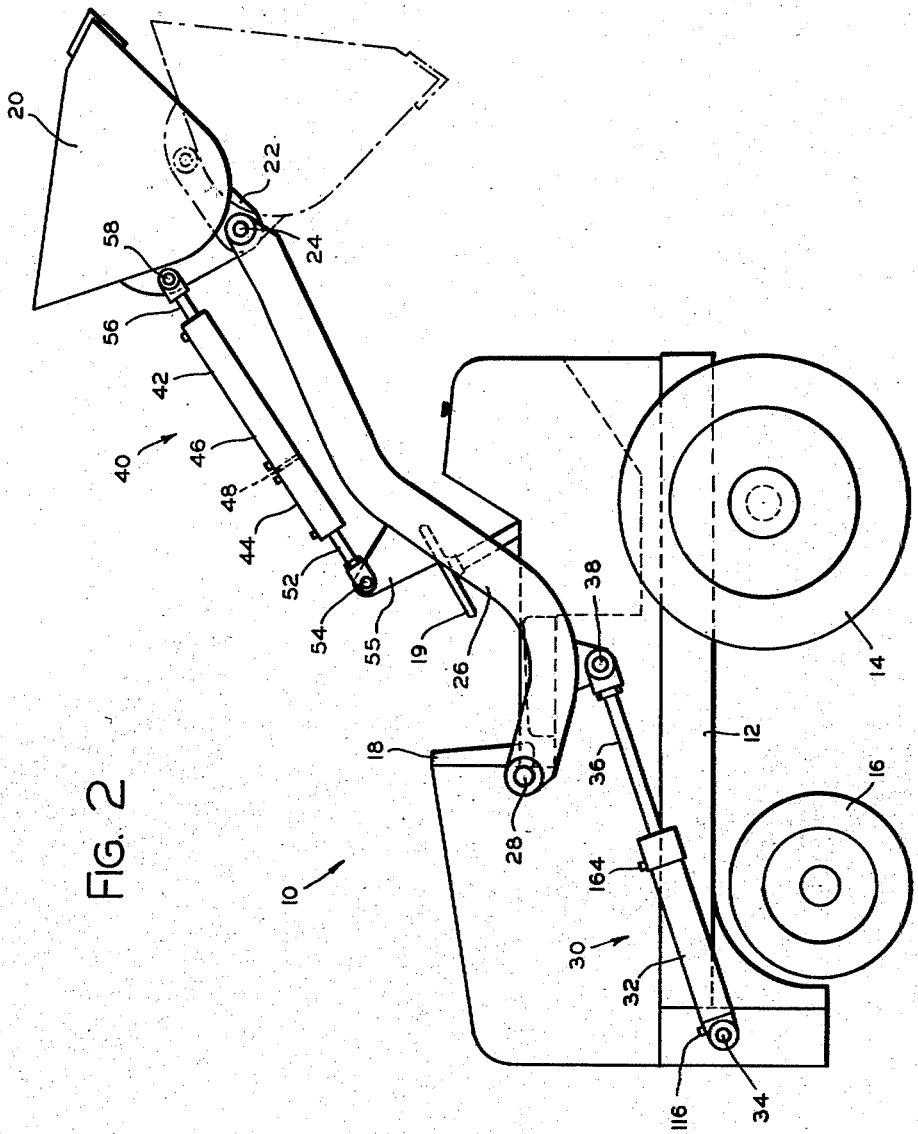

Referring now to Figures 1 and 2, there is indicated generally by the reference numeral 10 a mobile vehicle or industrial truck having a main frame 12. The truck 10 has forward drive wheels 14 and rear steering wheels 16, the latter of which are operatively associated with a hand steering wheel 19 disposed forwardly of an operator's seat 18. Suitable prime mover and transmission means (not shown) is provided for driving the forward drive wheels 14.

Arranged at the forward end of the truck 10 is a scoop or shovel 20 having rearwardly extending spaced apart brackets 22 (only one of which appears in the drawing) which are pivotally mounted on a transverse shaft 24 carried at the forward end of forwardly extending arm means. The forwardly extending arm means comprise a pair of arm members 26, one of which is arranged at either side of the truck 10. The arm members 26 are secured, at their rear ends, to the ends of a transverse shaft 28 which is journaled in the main frame 12 of the truck 10.

Suitable power actuated elevating means, comprising relatively movable members, is provided for pivoting the arm members 26 about the pivotal mounting of the shaft 28. The elevating means comprises a pair of hydraulic actuating assemblies, disposed respectively on opposite sides of the tractor shovel 10, and indicated generally by the reference numeral 30. Each hydraulic actuating assembly 30 comprises a cylinder 32 pivotally mounted at 34 to the main frame 12, and a piston rod 36 pivotally mounted at 38 to the adjacent arm 26. The operation of the hydraulic actuating assemblies 30 will be reviewed in detail hereinafter.

Power actuated or hydraulic actuating assembly means, indicated generally by the reference numeral 40, is provided on each side of the tractor shovel for effecting tilting of the shovel 20 relative to the arm members 26. Each power actuated means 40, in general, comprises relative movable members, and, more specifically, comprises an hydraulic cylinder 42 divided into sections 44 and 46 by a partition member 48. The cylinder section 44 is, as shown, shorter than the cylinder section 46. This relationship of relative lengths may be reversed, or both sections may be of the same length. Slidably mounted in the cylinder section 44 is a piston which is carried by a piston rod 52 pivotally mounted at 54 to a flange 55 secured to the adjacent arm member 26. The cylinder section 46 has slidably mounted therein a piston which is carried by a piston rod 56 pivotally mounted at 58 to the adjacent spaced bracket member 22. The purpose and the operation of the power actuated means 40 is discussed fully hereinafter.

Figures 3, 4:
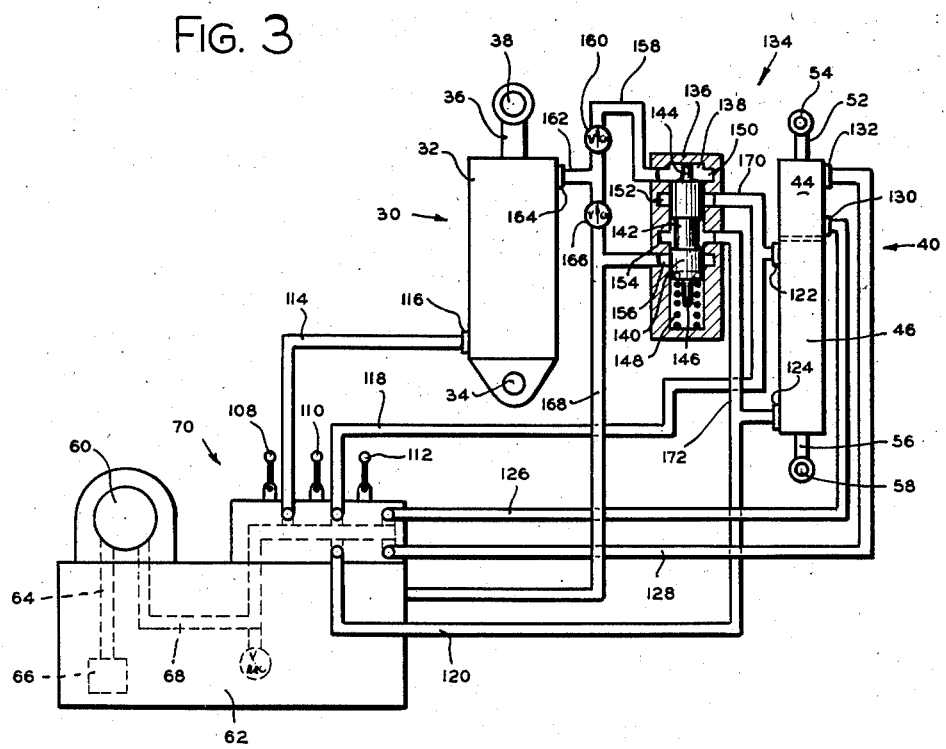
Figure 3 is a diagrammatic showing of the fluid circuit incorporated in my present invention.
Figure 4 is a sectional view of the valve mechanism that is embodied in the fluid circuit of Figure 3.

Referring now to Figure 3, there is shown the fluid circuit of my present invention. The fluid circuit comprises a fluid pump 60 for developing fluid under pressure. This fluid pump is located on tractor shovel 10 and ordinarily is driven by the prime mover which operates the drive wheels of the tractor shovel. The intake side of the pump 60 communicates with a sump tank 62 through a fluid line 64 and a filter screen 66. A fluid line 68 connects the pressure side of the pump 60 with a valve assembly indicated generally by the reference numeral 70. The valve assembly 70, as shown in detail in Figure 4, comprises a valve block 72 having parallel valve openings 74, 76 and 78 formed therethrough. Both the upper and lower ends of the valve openings 74, 76 and 78 communicate with the interior of the sump tank 62.

Annular grooves 80 and 82 are formed in the valve opening 74; annular grooves 84, 86 and 88 are formed in the valve opening 76; and annular grooves 90, 92 and 94 are formed in the valve opening 78. Slidably mounted, respectively, in the valve openings 74, 76 and 78 are valve members 96, 98 and 100 which have annular channels 102, 104 and 106 formed intermediate of their ends. Movement of the valve members 96, 98 and 100 within the valve openings 74, 76 and 78 is adapted to be effected by means of manually operable control levers 108, 110 and 112, shown in Figure 3, which preferably are arranged conveniently adjacent the operator's seat 18 on the tractor shovel.

The annular grooves 82, 86 and 92 are in continuous communication with the pressure line 68. The annular groove 80 communicates, through fluid passageway means 114, with a port 116 formed in the one end of the cylinder 32 of each of the hydraulic actuating assemblies 30. Hereinafter I refer to hydraulic actuating assemblies 30 and 40 in the singular in many instances in order to simplify the explanation of the fluid circuit; however, it should be kept in mind that there are two of each of these assemblies located respectively on opposite sides of vehicle 10. The two assemblies 30 preferably are identical and they are connected in the fluid circuit in a manner such that they act simultaneously and in synchronism at all times. Similarly the two assemblies 40 are identical, are connected in the fluid circuit in an identical manner, and always operate together. The annular grooves 84 and 88 respectively communicate through fluid passageway means 118 and 120 with ports 122 and 124 formed at the ends of the cylinder sections 46 of the power actuated means 40. The annular grooves 90 and 94 communicate respectively through fluid passageway means 126 and 128 with ports 130 and 132 formed at the ends of the cylinder section 44 of the power actuated means 40.

Also arranged in the fluid circuit of my present invention is a valve assembly, indicated generally by the reference numeral 134, which comprises a valve body or housing 136 having a chamber 138 formed therein. Slidably mounted in the valve chamber 138 is a valve member 140 having an annular channel 142 formed intermediate of the ends thereof. The valve member 140 is also formed with axially extending nose portions 144 and 146, and is biased to the position shown in Figure 3 by means of a coil spring 148 arranged about the nose portion 146. Axially spaced annular grooves 150, 152 and 154 and 156 are formed in the valve opening 138.

The annular groove 150 communicates through a fluid line 158 with a check valve 160 having connection through a fluid line 162 with a port 164 formed in the end of the cylinder 32 of the hydraulic actuating assembly 30. The fluid line 162 also communicates with a check valve 166 which has connection through a fluid line 168 with the annular groove 156 and the sump tank 62. The annular groove 152 communicates through a fluid line 170 with the aforedescribed fluid passageway means 118 while the annular groove 154 communicates through a fluid line 172 with the aforedescribed fluid passageway means 120.

In the operation of the mechanism of my present invention, the vehicle 10 is driven to the location where a load is to be engaged and the shovel 20 is positioned in front of the load. If loose material is to be picked up in the scoop 20, the control lever 112 of the valve mechanism 70 is manually actuated for admitting fluid under pressure, from the pump 60 to port 130 in the cylinder section 44 of the power actuated means 40, through the fluid line 68, annular groove 92, annular channel 106, annular groove 90, and fluid passageway means 126. The port 132 is simultaneously placed in communication with the sump tank 62 through the fluid line 128, annular groove 94 and valve opening 78. The piston rod 52 is thereby distended and the scoop 20 is tilted clockwise from the dot-dash line position shown in Figure 1 to the solid line scooping position.

After the truck has been driven forward and the scoop 20 filled with loose material, the control lever 112 is actuated for admitting fluid under pressure from the pump 60 to port 132 in the cylinder section 44, through the fluid line 68, annular groove 92, annular channel 106, annular groove 94, and fluid passageway means 128. Simultaneously, fluid is bled from port 130 through the fluid passageway means 126 which communicates with the annular groove 90, valve opening 78 and hence the sump tank 62. With the fluid directed in this manner, the cylinder section 44 is drawn upwardly to the left and the scoop 20 is tilted from the solid line position shown in Figure 1 to the dot-dash line load-carrying position. By returning the control lever 112 to a neutral position, the piston rod is held within the cylinder section 44.

The shovel 20 may be elevated, for permitting the load to be transported by the vehicle 10, by actuating the control lever 108 for admitting fluid under pressure from the pump 60 to the port 116 in the cylinder 32 of the hydraulic actuating assembly 30, through the fluid line 68, annular groove 82, annular channel 102, annular groove 80 and fluid passageway means 114. Admission of fluid to the lower end of the cylinder 32 causes the piston rod 36 to be extended thereby causing pivotal movement of the arm members 26 about the pivotal mounting of the shaft 28.

As the piston rod 36 is extended, fluid in the upper end of the cylinder 32 is expelled through the port 164 and is forced through the fluid line 162, check valve 160, and fluid line 158 to the annular groove 150 formed in the valve assembly 134. Fluid in the line 162 is prevented from returning to the sump tank 62 by the check valve 166.

The fluid, which enters the chamber 138 in the valve assembly 134 around the nose portion 144, forces the valve 140 downwardly, as viewed in Figure 3. The annular grooves 150 and 152 are thereupon placed in communication and fluid is permitted to flow to the rear end of the cylinder section 46 through the fluid passageway means 170 and port 122. At the same time, the annular grooves 154 and 156 of the valve assembly 134 are placed in communication for permitting fluid to be returned from the forward end of the cylinder section 46 to the sump tank 62, through port 124, and fluid lines 172 and 168.

Entrance of the fluid into the cylinder section 46 causes the piston rod 56 to be distended synchronously with, and at a corresponding rate to, the piston rod 36 of the elevating assembly. Consequently, the scoop 20 is tilted or pivoted relative to the arm members 26, but is maintained in the same position relative to the ground during the entire range of elevation. During elevation of the arm members 26, the scoop is moved from the dot-dash line position shown in Figure 1 to the solid line position shown in Figure 2.

As the arm members 26 reach the elevated point desired, the spring 148 urges the valve 140 upwardly to the position shown in Figure 3 for blocking fluid flow to or from the cylinder section 46, unless the control lever 110 is actuated. It will be understood that when fluid ceases to flow into the lower end of cylinder 32 that pressure in line 158 is relieved to allow the spring 148 to act; pressure is relieved in line 158 because the weight of the bucket 20 exerts a pull on piston rod 56 which tends to create a suction on the opposite end of cylinder 46 adjacent port 122. This action immediately relieves the pressure in line 158 as soon as fluid flow ceases from port 164 of cylinder 32 into line 158.

With the shovel 20 in an elevated position, such as shown in Figure 2, the contents thereof may be dumped by actuating the control lever 110 so as to admit fluid under pressure from the pump 60 to the rear end of the cylinder section 46, through the fluid line 68, annular groove 86, annular channel 104, annular groove 84, fluid passageway means 118 and port 122. The port 124 is simultaneously placed in communication with the sump tank 62 through the fluid line 120, annular groove 88 and valve opening 76. Admission of fluid to the port 122 in the cylinder section 46 causes the piston rod 56 to be further distended for effecting tilting or pivoting of the shovel 20 from the solid line load-carrying position of Figure 2 toward the dot-dash line dumping position.

If additional forward tilting of the shovel is desired, the piston 52 of the cylinder section 44 may be distended along with the piston rod 56.

The scoop 20 may be returned to the solid line position of Figure 2 by actuating the control lever 110 for admitting fluid under pressure from the pump 60 to the port 124 of the cylinder section 46, through the fluid line 68, annular groove 86, annular channel 104, annular groove 88, and fluid passageway means 120. Simultaneously, the port 122 is placed in communication with the sump tank 62 through the fluid line 118, annular groove 84 and valve opening 76. Fluid is prevented from flowing through the valve 98 by disposing the latter in a neutral position.

The arm members 26 and scoop 20 may be lowered by actuating the control lever 108 so as to permit fluid to return from the lower end of the cylinder 32 to the sump tank 62 through the port 116, fluid line 114, annular groove 80 and the upper end of valve opening 74. The weight of the mechanism will force the piston rod 36 inwardly of the cylinder 32. As the piston rod 36 moves inwardly of the cylinder 32, a suction is created at the upper end of the cylinder 32 and fluid is drawn therein from the sump tank 62 through the fluid line 162, check valve 166 and fluid line 168. The arm members 26 may be maintained in any predetermined elevated position by disposing the control lever 108 in a neutral position.

With the arm members 26 lowered to the position shown in Figure 1, the above-described cycle of scooping, transporting and dumping may be repeated.

Now, while I have shown and described what I believe to be a preferred embodiment of my present invention, it will be understood that various rearrangements and modifications may be made therein without departing from the spirit and scope of my invention.

I claim:

1. For use with a vehicle having a main frame, the combination of a shovel, forwardly extending arm means pivoted at the rear end to the vehicle frame and at the forward end to said shovel, first hydraulic actuating assembly means carried by the vehicle and having connection with said arm means for effecting pivotal movement of the latter whereby said shovel may be raised, second hydraulic actuating assembly means carried by said arm means for tilting said shovel relative to said arm means, a pump for developing fluid under pressure, first fluid passageway means for conveying fluid from said pump to one end of said first hydraulic actuating assembly means for actuating the latter so that said arm means may be pivoted upwardly, and second fluid passageway means for conveying fluid from the other end of said first hydraulic actuating assembly means to one end of said second hydraulic actuating assembly means for actuating the latter whereby said shovel is automatically tilted relative to said arm means during elevation of said shovel for maintaining a shovel parallel to the ground.

2. For use with a vehicle having a main frame, the combination of a shovel, forwardly extending arm means pivoted at the rear end to the vehicle frame and at the forward end to said shovel, first hydraulic actuating assembly means carried by the vehicle and having connection with said arm means for effecting pivotal movement of the latter whereby said shovel may be raised, second hydraulic actuating assembly means carried by said arm means for tilting said shovel relative to said arm means, a pump for developing fluid under pressure, first fluid passageway means for conveying fluid from said pump to one end of said first hydraulic actuating assembly means for actuating the latter so that said arm means may be pivoted upwardly, second fluid passageway means for conveying fluid from the other end of said first hydraulic actuating assembly means to one end of said second hydraulic actuating assembly means for actuating the latter whereby said shovel is automatically tilted relative to said arm means during elevation of said shovel for maintaining the shovel parallel to the ground, third fluid passageway means having connection with said pump and both ends of said second hydraulic actuating assembly means, and valve means interposed in said third fluid passageway means and being selectively operable to direct fluid under pressure to either end of said second hydraulic actuating assembly means for effecting tilting of said shovel independently of actuation of said first hydraulic actuating assembly means.

3. For use with a vehicle having a main frame, the combination of a shovel, forwardly extending arm means pivoted at the rear end to the vehicle frame and at the forward end to said shovel, first hydraulic actuating assembly means carried by the truck and having connection with said arm means for effecting pivotal movement of the latter whereby said shovel may be raised or lowered, second hydraulic actuating assembly means carried by said arm means for tilting said shovel relative to said arm means, a pump for developing fluid under pressure, first fluid passageway means for conveying fluid from said pump to one end of said first hydraulic actuating assembly means for actuating the latter so that said arm means may be pivoted upwardly, second fluid passageway means for conveying fluid from the other end of said first hydraulic actuating assembly means to one end of said second hydraulic actuating assembly means for actuating the latter whereby said shovel is automatically tilted relative to said arm means during elevation of said shovel for maintaining the shovel parallel to the ground, third fluid passageway means for placing the other end of said second hydraulic actuating assembly means in communication with the intake side of said pump, normally closed valve means interposed in said second and third fluid passageway means for preventing passage of fluid therethrough, and said valve means being opened automatically by the pressure of fluid when said first hydraulic actuating assembly means is actuated.

4. For use with a vehicle having a main frame, the combination of a shovel, forwardly extending arm means pivoted at the rear end to the vehicle frame and at the forward end to said shovel, first hydraulic actuating assembly means carried by the vehicle and having connection with said arm means for effecting pivotal movement of the latter whereby said shovel may be raised or lowered, second hydraulic actuating assembly means carried by said arm means for tilting said shovel relative to said arm means, a pump for developing fluid under pressure, first fluid passageway means for conveying fluid from said pump to one end of said first hydraulic actuating assembly means for actuating the latter so that said arm means may be pivoted upwardly, second fluid passageway means for conveying fluid from the other end of said first hydraulic actuating assembly means to one end of said second hydraulic actuating assembly means for actuating the latter whereby said shovel is automatically tilted relative to said arm means during elevation of said shovel for maintaining the shovel parallel to the ground, third fluid passageway means for placing the other end of said second hydraulic actuating assembly means in communication with the intake side of said pump, normally closed valve means interposed in said second and third fluid passageway means for preventing passage of fluid therethrough, said valve means being opened automatically by the pressure of fluid when said first hydraulic actuating assembly means is actuated, fourth fluid passageway means having connection with said pump and both ends of said second hydraulic actuating assembly means, and manually operable valve means interposed in said fourth fluid passageway means and being selectively operable to direct fluid under pressure to either end of said second hydraulic actuating assembly means for effecting tilting of said shovel independently of actuation of said first hydraulic actuating assembly means.

5. For use with a vehicle having a main frame, the combination of a shovel, forwardly extending arm means pivoted at the rear end to the vehicle frame and at the forward end to said shovel, first hydraulic actuating assembly means carried by the vehicle and having connection with said arm means for effecting pivotal movement of the latter whereby said shovel may be raised or lowered, second hydraulic actuating assembly means carried by said arm means for tilting said shovel relative to said arm means, a pump for developing fluid under pressure, said pump having connection with a sump, first fluid passageway means having connection with said pump and sump and one end of said first hydraulic actuating assembly means, first valve means interposed in said first fluid passageway means for either connecting said pump to said first hydraulic means for actuating the latter so that said arm means may be pivoted upwardly or connecting said sump to said first hydraulic means whereby fluid is drained from the said one end of the latter so that said arm means may be lowered, second fluid passageway means between said sump tank and the other end of said first hydraulic actuating assembly means through which fluid may be drawn when fluid is being drained from the said one end of said first hydraulic means, a check valve interposed in said second fluid passageway means for preventing fluid from flowing from said other end of said first hydraulic means to said sump, third fluid passageway means for conveying fluid from the other end of said first hydraulic means to one end of said second hydraulic means for actuating the latter whereby said shovel is automatically tilted relative to said arm means during elevation of said shovel for maintaining the shovel parallel to the ground, a check valve interposed in said third fluid passageway means for preventing fluid from flowing from said one end of said second hydraulic means to said other end of said first hydraulic means, fourth fluid passageway means for placing the other end of said second hydraulic means in communication with said sump, normally closed valve means interposed in said third and fourth fluid passageway means for preventing passage of fluid therethrough, and said last-named valve means being opened automatically by the pressure of fluid when said first hydraulic means is actuated.

6. For use with a vehicle having a main frame, the combination of a shovel, forwardly extending arm means pivoted at the rear end to the vehicle frame and at the forward end to said shovel, first hydraulic actuating assembly means carried by the vehicle and having connection with said arm means for effecting pivotal movement of the latter whereby said shovel may be raised or lowered, second hydraulic actuating assembly means carried by said arm means for tilting said shovel relative to said arm means, a pump for developing fluid under pressure, said pump having connection with a sump, first fluid passageway means having connection with said pump and sump and one end of said first hydraulic actuating assembly means, first valve means interposed in said first fluid passageway means for either connecting said pump to said first hydraulic means for actuating the latter so that said arm means may be pivoted upwardly or connecting said sump to said first hydraulic means whereby fluid is drained from the said one end of the latter so that said arm means may be lowered, second fluid passageway means between said sump tank and the other end of said first hydraulic actuating assembly means through which fluid may be drawn when fluid is being drained from the said one end of said first hydraulic means, a check valve interposed in said second fluid passageway means for preventing fluid from flowing from said other end of said first hydraulic means to said sump, third fluid passageway means for conveying fluid from the other end of said first hydraulic means to one end of said second hydraulic means for actuating the latter whereby said shovel is automatically tilted relative to said arm means during elevation of said shovel for maintaining the shovel parallel to the ground, a check valve interposed in said third fluid passageway means for preventing fluid from flowing from said one end of said second hydraulic means to said other end of said first hydraulic means, fourth fluid passageway means for placing the other end of said second hydraulic means in communication with said sump, normally closed valve means interposed in said third and fourth fluid passageway means for preventing passage of fluid therethrough, said last-named valve means being opened automatically by the pressure of fluid when said first hydraulic means is actuated, fifth fluid passageway means having connection with said pump and sump and both ends of said second hydraulic means, and manually operable valve means interposed in said fifth fluid passageway means and being selectively operable to direct fluid under pressure to either end of said second hydraulic means while bleeding pressure from the other end for effecting tilting of said shovel independently of actuation of said first hydraulic means.

7. In a tractor shovel having pivoted arms and pivoted scoop means located at the outer extremity of the arms, hydraulic operating means for the arms and scoop means comprising a sump tank for containing hydraulic fluid, a pump arranged to withdraw fluid from the said tank and discharge fluid under pressure, first hydraulic actuating means for pivoting the arms to selected operating positions, the said first hydraulic actuating means including a first closed cylinder and a first piston slidable therein, second hydraulic actuating means for pivoting the scoop means on the arms, the said second hydraulic actuating means including a second closed cylinder and a second piston slidable therein, first valve and fluid passageway means for selectively admitting fluid under pressure from the said pump to one end of the said first cylinder and releasing fluid from the said one end to return to the said sump tank whereby the arms may be selectively raised and lowered, automatic valve means for directing fluid forced from the other end of the said first cylinder into one end of the said second cylinder for maintaining the scoop means level while the arms are being raised, and a check valve connected in a fluid passageway between the said sump and the said other end of the said first cylinder for drawing fluid from the sump tank into the other end of the first cylinder when the arms are lowered whereby to maintain fluid in the other end of the first cylinder at all times.

8. In a vehicle having a main frame, the combination of a load handling device, outwardly extending arm means pivoted to the vehicle frame and having said device pivotally supported thereon near the outer end of the arms, power actuated means carried by the vehicle and having connection with said arm means for effecting pivotal movement of the latter whereby said device may be raised and lowered, first fluid means carried by said arm means for tilting said device relative to said arm means, second fluid means arranged coaxially with said first fluid means for tilting said device relative to said arm means, manually operable means for selectively effecting actuation of said first fluid means whereby said device may be tilted, and means responsive to pivotal movement of said arm means for effecting actuation of said second fluid means whereby said device is automatically tilted relative to said arm means during elevation of said device for maintaining a section of the device cut by any given horizontal plane substantially parallel to the ground.

9. In a materials handling machine having pivoted outwardly extending arm means, a load handling device pivotally connected to the arm means near the outer end thereof, and power actuated means for pivoting the arm means to raise and lower the load handling device, the combination of a pair of coaxially arranged fluid actuators carried by the arm means and arranged to tilt the load handling device, manual means for selectively operating a first one of said actuators for tilting the load handling device, a fluid carrying interconnection between said power actuated means and said second actuator, and said power actuating means serving to effect operation of said second actuator through said fluid interconnection whereby said device is automatically tilted relative to said arm means during elevation of said device.

10. In a materials handling machine having pivoted outwardly extending arm means and a load handling device pivotally connected to the arm means near the outer end thereof, the combination of a piston and cylinder fluid device for pivoting the arm means to raise and lower the load handling device, two coaxially arranged fluid actuators carried by the arm means and arranged to tilt the load handling device, manual means for selectively operating a first one of the said actuators for tilting the load handling device, and fluid means connected between said cylinder and piston fluid device and said second fluid actuator and responsive to movement of said piston and cylinder device for operating the second actuator to automatically tilt the load handling device relative to the arm means during pivoting operation of the arm means for maintaining the load handling device in a selected position relative to ground during raising and lowering operation.

References Cited in the file of this patent
UNITED STATES PATENTS

| | | |
|---|---|---|
| 2,482,612 | Drott et al. | Sept. 20, 1949 |
| 2,517,582 | Lull | Aug. 8, 1950 |
| 2,590,454 | Pilch | Mar. 25, 1952 |
| 2,613,822 | Stanley | Oct. 14, 1952 |